Oct. 25, 1966   W. W. LOGAN   3,281,153
DICTATING MACHINE
Filed Aug. 28, 1963   3 Sheets-Sheet 1

INVENTOR.
WILLIAM W. LOGAN
BY George H. Fritzinger
AGENT

Oct. 25, 1966   W. W. LOGAN   3,281,153
DICTATING MACHINE
Filed Aug. 28, 1963   3 Sheets-Sheet 2
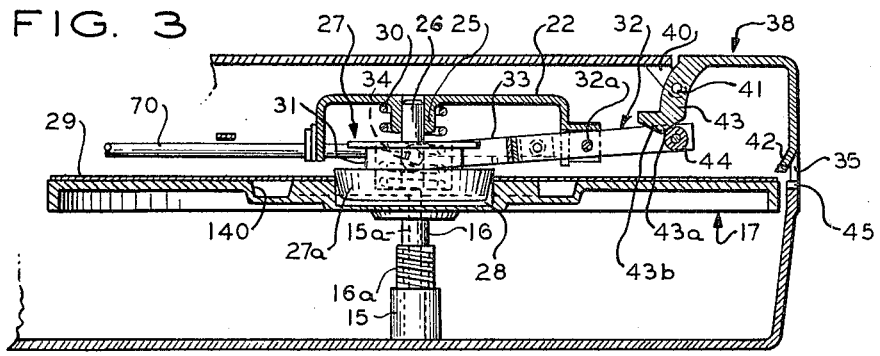
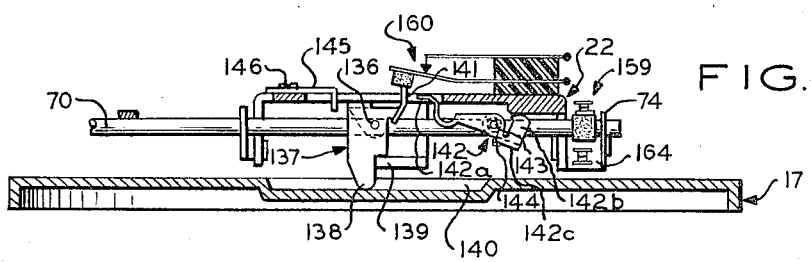
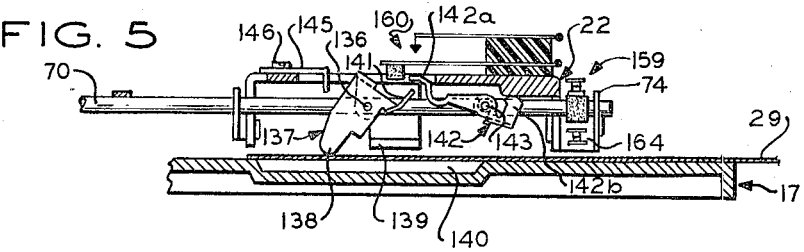
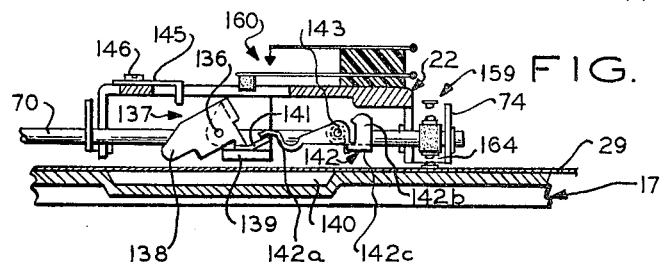
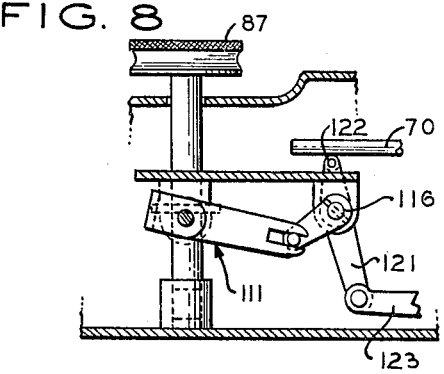
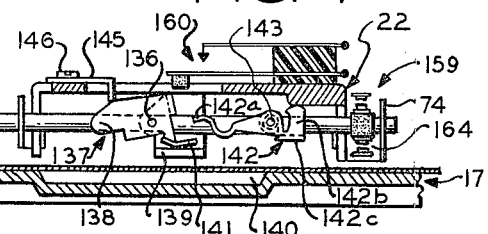
INVENTOR.
WILLIAM W. LOGAN
BY
George H. Fritzinger
AGENT

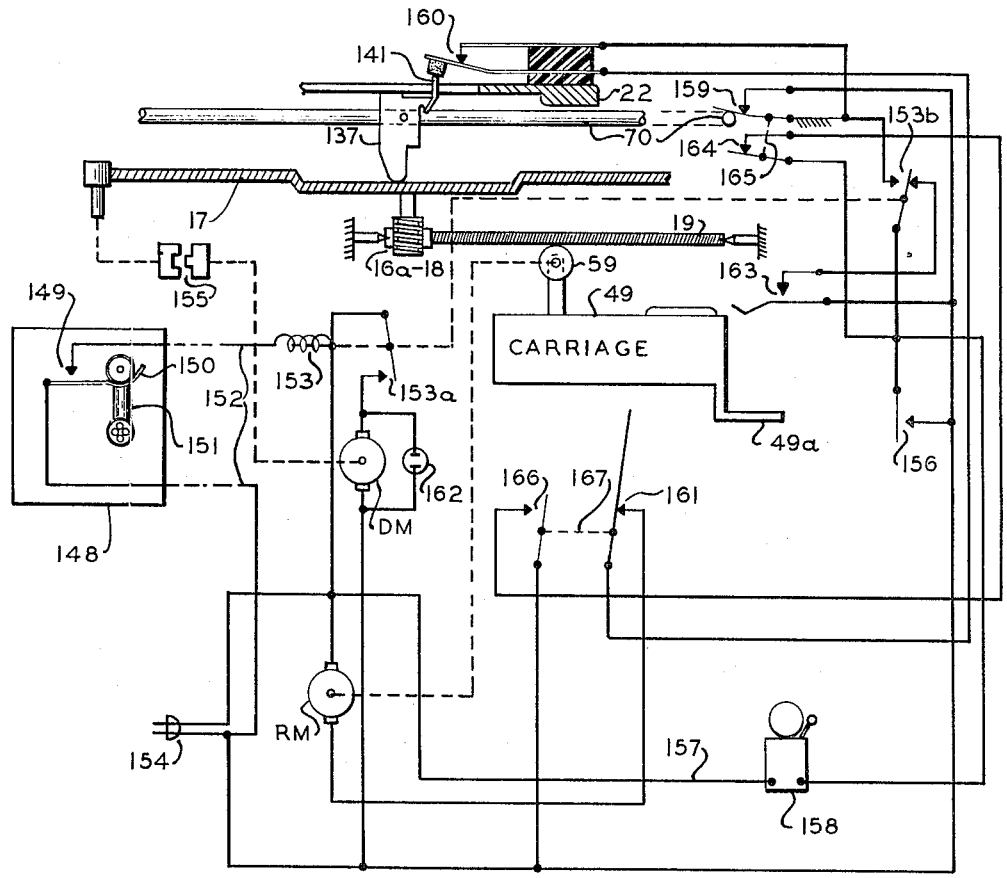

United States Patent Office

3,281,153
Patented Oct. 25, 1966

3,281,153
DICTATING MACHINE
William W. Logan, Glen Ridge, N.J., assignor to McGraw-Edison Company, Elgin, Ill., a corporation of Delaware
Filed Aug. 28, 1963, Ser. No. 305,089
7 Claims. (Cl. 274—14)

This invention relates especially to dictating machine systems wherein the machine itself is of a type disclosed in the Dietz Patent No. 2,793,864, dated May 28, 1957, and is located at an attendant's station remote from the dictator's station. More particularly, the invention relates to a new and improved control means for returning the head carriage to home position responsive to changing the record on the machine.

In large installations of remotely controlled dictating machine systems, an attendant will supervise a group of dictating machines. A suitable signal is given to apprise the attendant when a record is to be changed on any one of the machines, such need arising, for example, whenever the user records to the end of the record or whenever the user terminates his use of the machine after having dictated past an intermediate end point as in accordance with the teaching of the Kobler Patent No. 2,650,951, dated September 1, 1953. Such change of record is carried out by the attendant returning the head carriage to home position, opening a lid on the machine to provide access to the record and to lift the styli from the record, replacing the user record by a new record, and reclosing the lid to lower the styli onto the record. To facilitate this operation it has been customary to return the carriage automatically to home position responsive to the opening of the lid.

When an attendant supervises a number of machines placed side-by-side in the same room, she may sometimes mistakenly identify the signal with the wrong machine and raise the lid of a machine in use before noting her error. Heretofore, this error would cause the carriage to be returned automatically towards home position with the result that the continuity of the recorded dictation on the record is thus broken to the great surprise and dismay of the user of the machine. Although an alarm is given to apprise the attendant the instant the lid is so opened while the machine is in use any immediate reclosing of the lid will not restore the carriage to its position of farthest advance so that the user may continue to record his dictation.

The present invention resides in a control and alarm system wherein the attendant is apprised whenever a change of record is needed and whenever the attendant accidentally lifts the lid of a machine already in use, but in not automatically returning the carriage until a record is removed from the machine. Thus, any accidental lifting of the lid of a machine in use will only blank out the recording for the instant the lid is so raised without disrupting the progressive advance of the carriage along the record.

It is an object of the invention to provide improved control and signalling means for remotely controlled dictating machines which will result in better and more reliable servicing of the machines by an attendant.

Another object is to provide a dictating machine with means which automatically returns the carriage to home position responsive to changing the record on the machine.

Another object is to provide such improved control means for automatically returning the carriage to home position only when a manipulation is performed to gain access to the mounted record and when the mounted record is removed from the machine.

These and other objects and features of the invention will be apparent from the following description and the appended claims.

In the description of the invention, reference is had to the accompanying drawings, of which:

FIGURE 1 is a fractional top plan view of a dictating machine incorporating my invention;

FIGURES 2 and 3 are sectional views respectively taken approximately upon the lines 2—2 and 3—3 of FIGURE 1;

FIGURE 4 is a sectional view taken substantially on the line 4—4 of FIGURE 1 showing a safety mechanism in effective position to prevent the translating devices from being lowered into effective positions except when a record is on the turntable;

FIGURE 5 is a fractional view of the safety mechanism appearing in FIGURE 4, showing this mechanism in the intermediate ineffective position which it assumes when a record is moved onto the turntable;

FIGURE 6 shows the positioning of this safety mechanism after a record is mounted on the turntable and the recorder and reproducer are engaged with the record;

FIGURE 7 is a view similar to FIGURE 6 showing the safety mechanism in the fully ineffective position which it assumes when a record is on the record support and only the reproducer is engaged with the record;

FIGURE 8 is a fractional sectional view taken substantially on the line 8—8 of FIGURE 1; and FIGURE 9 is a diagrammatic view of circuits and mechanism showing the electrical circuit system of the machine in accordance with the invention.

Figure 2:
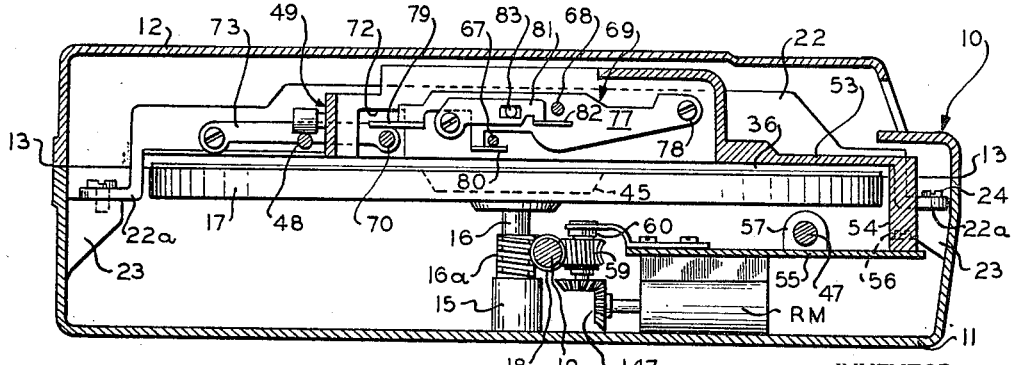

The present dictating machine may by way of preferred example have a housing 10 comprising relatively flat lower and upper pan-like members 11 and 12 rectangular as viewed from the top, which meet on a horizontal plane at the line 13—13 of FIGURE 2 to form a closed structure, the two housing members being secured together by suitable means not herein necessary to show. The lower housing member, which serves also as a frame structure for the machine, has a boss 15 provided with an upstanding pin 15a (FIGURE 3) to form a bearing for a shaft 16 of a turntable 17. The shaft 16 rests rotatably on the upper face of the boss to support the turntable vertically. The shaft is spirally grooved to form a worm gear 16a which meshes with a similarly grooved worm wheel portion 18 of a transverse lead screw 19. This lead screw is supported rotatably at its ends by cone pivots 20 on brackets 21 upstanding from the lower housing member. The turntable is rotated in direction of arrow A by a drive motor DM, diagrammatically shown in FIGURE 9, and the lead screw is turned through its worm-gear coupling with the turntable.

Overlying a central portion of the turntable is a front-to-back extending bridge 22 having footlike portions 22a at its ends mounted on integral bracket extensions 23 of the lower housing member and held thereto by screws 24. On this bridge axially in line with the turntable is a bearing 25 slidably receiving a rod 26 (FIGURE 3) for vertical reciprocative movement. Staked to the lower end of this rod is a hollow circular record centering and/or clamping member 27 (hereinafter referred to simply as a securing member), the lower portion 27a of which is tapered and adapted to fit into a central well 28 of the turntable to center and hold thereon a thin record disc 29 having a central opening just slightly smaller in diameter than that of the central well. A compression spring 30 is interposed between the bridge 22 and the securing member 27 in surrounding relation to the rod 26 and bearing 25 to urge the securing member downwardly into record-centering position. The upper portion of the securing member surrounds the compression spring 30 and is provided with a wide peripheral groove 31. A lever 32 is pivoted at 32a to the right side of the bridge 22 and is provided with a fork 33 at its inner end in embracing relation with the upper grooved portion of the securing member. Secured to this fork are diametrically-opposite and inwardly-extending pins 34 which engage the groove 31 to couple the lever 32 to the securing member. On rocking the lever 32 clockwise (FIGURE 3), the securing member is disengaged from the turntable and record and, on release of the lever, the securing member is engaged with the record and turntable by the spring 30.

The record disc is slid onto the turntable through a narrow slot 35 in the right side of the housing. This slot is slightly longer than the diameter of the record, and is at a level extending upwardly from the top face of the turntable. The horizontal portion of the bridge 22 and the turntable form the top and bottom walls of a record guideway 36 inside the housing, and the depending foot portions 22a of the bridge form the side walls of this guideway. At the inner side of the turntable opposite the slot 35 there is a bracket 37 on the lower housing member forming a record stop. As a record is inserted into the slot the same is guided into an approximately centralized position on the turntable, and upon next releasing the record-securing lever 32 the cone-shaped securing member enters the central opening of the record to finally center the record and thereupon hold the same to the turntable.

Figure 1:
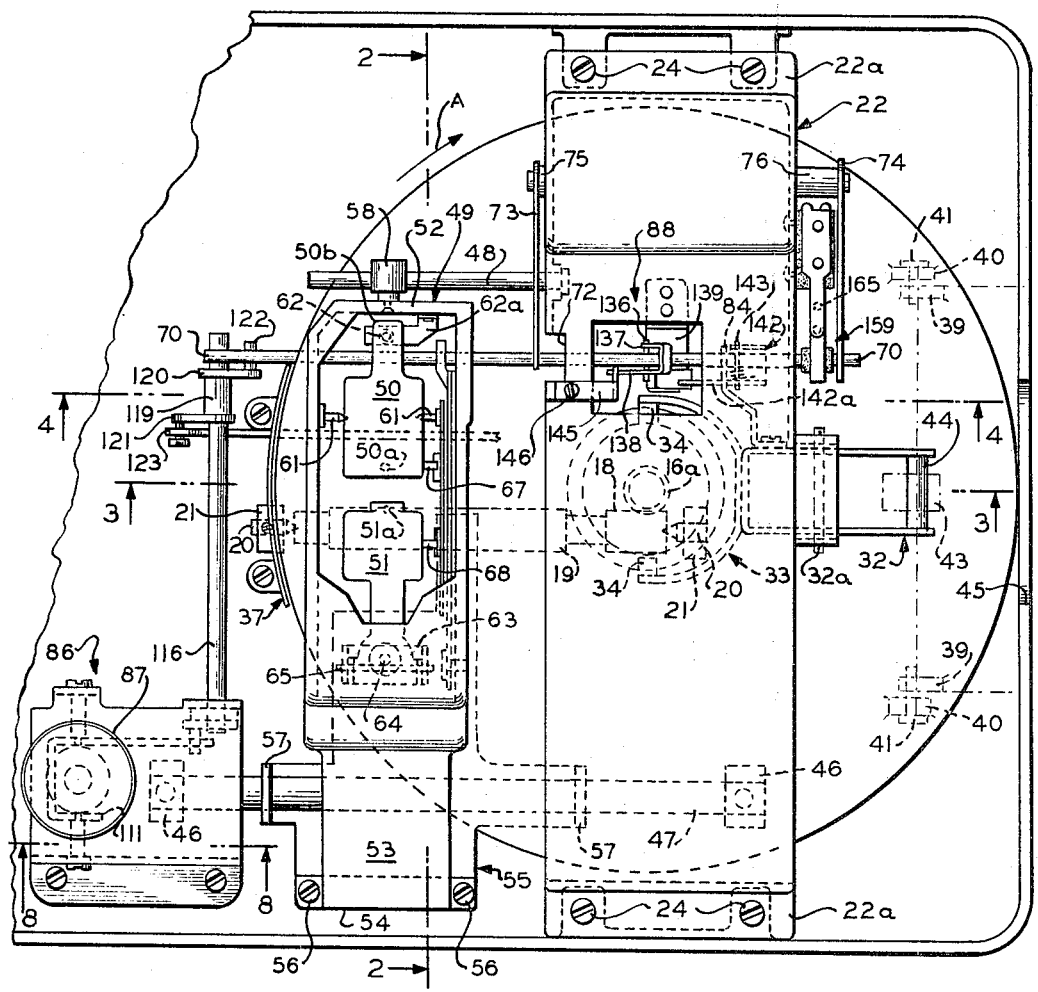

To facilitate removal of the record disc, a rectangular lid section 38 of the upper housing member, which leads from the slot 35, is pivoted along its inner edge for upward tilting movement into open position. As indicated by dash-dot lines in FIGURE 1, this openable lid section is approximately half as long as the diameter of the turntable. The pivoting means for this lid section comprises depending standards 39 on the upper housing member, respectively adjacent standards 40 on the lid section, and respective cross pins 41 pivotally interconnecting the standards. The cover section is weight-biased into closed position shown in FIGURE 3. When it is in this closed position, an inwardly-curved lip 42 of the lid section blocks the slot 35 to prevent insertion of a record disc. This is provided to force opening of the lid section preliminary to removal of a record disc from the turntable.

At the inner portion of the lid section 38 there is a depending arm 43 having a cam face 43a and dwell 43b. As the lid section is opened, the arm 43 swings downwardly against a roller 44 pivoted to the record-securing lever 32, to cause this lever to be cammed clockwise (FIGURE 3) wherefore to disengage the record-securing member from the record disc. In the latter portion of the opening movement of the lid section, the dwell 43b comes onto the roller to lock the lever 32 in its operated position and to retain the cover in open position. The central portion of the bottom edge of the slot 35 is recessed at 45 (FIGURES 1 and 3) so that when the lid section 38 is open the user will have access to take hold of the outermost portion of the disc record and draw it from the turntable with an outward and upward sweep of the hand. After inserting a record disc on the turntable, the cover section 38 is returned to closed position. As this is done the record-securing member is released to center the record on the turntable as before explained.

On the lower housing member in the front portion thereof, there are two transversely-spaced standards 46 supporting a cross rod 47. Stacked to the left wall of the bridge 22 is a second cross rod 48 which is in the rearward portion of the housing and parallel to the rod 47. These cross rods 47 and 48 carry slidably a carriage 49 for recording and reproducing devices 50 and 51. The carriage may be a casting comprising a hollow rectangular portion 52 totally open at the bottom and partially open at the top (FIGURE 1) and an integral forward extension 53 having a footlike portion 54 depending from the forward end thereof. A horizontal plate 55 is secured by screws 56 to the bottom face of the portion 54 and extends inwardly below the carriage. This plate has two apertured lugs 57 struck upwardly therefrom which slidably embrace the cross rod 47 to support the carriage at its forward end. A pin 58 is riveted to the rear wall of the rectangular carriage portion 52 and rests slidably on the cross rod 48 to support the carriage at its rearward end. As so mounted the carriage overlies the inner left half portion of the turntable for radial movement thereacross.

The carriage is driven by the lead screw 19 as by way of a circular feed nut 59 rotatably mounted on the carriage plate 55 in meshing relation with the lead screw and frictionally held sufficiently against rotation as by a friction connection 60 interposed between it and the carriage plate to cause the carriage to be driven as the lead screw is turned. However, the frictional means 60 is adapted to yield to force exerted on the feed nut 59 so that the carriage can be shifted to any desired position in its range of travel.

The recorder 50 is carried on cone pivots 61 mounted on the opposite walls of the carriage, and has a stylus 50a at its forward end for engaging a mounted record. Biasing force to engage the stylus with the record is provided partially by the weight thereof and partially by a compression spring 62 interposed between a rearward tab 50b on the recorder and a bracket 62a on the carriage.

The reproducer 51 is mounted in front of the recorder for universal (lateral and vertical) movement relative to the carriage. A universal mounting for the reproducer comprises a gimbal ring 63 pivoted to the frame on a vertical pin 64 and a cross pin 65 on the gimbal ring to which a tailpiece of the reproducer is pivoted. The reproducer has a stylus 51a at its rearward end for engaging the record as in response to a weight biasing of the reproducer. In its normally laterally-centralized position, the reproducer stylus engages the record at a short distance behind the recorder as with respect to the direction of travel of the carriage.

The recorder and reproducer have lateral pins 67 and 68 at their free end portions by which they may be lifted from the turntable as during record replacement. The lifting is done through a lever mechanism 69 mounted on the right wall of the carriage and operated by a lift rod 70 extending parallel to the path of movement of the carriage through slots 72 in the carriage 49 and bridge 22 (FIGURE 2). The right half portion of the rod is secured to arms 73 and 74 forming a bail, which are pivoted to opposite sides of the bridge 22, as to respective outwardly-extending bosses 75 and 76, to permit the rod 70 to be moved up and down with horizontal parallel movement.

The lever mechanism 69 comprises a front-to-back extending lever 77 pivoted at 78 to the right wall of the carriage and having a tailpiece 79 resting slidably on the lift rod 70. This lever has an intermediate tab 80 underlying the pin 67 for lifting the recorder as the lift rod 70 is raised. The mechanism 69 further includes a relatively short back-to-front extending lever 81 which has a tab 82 underlying the pin 68 of the reproducer. The lever 81 is coupled to the lever 77 through a pin and slot connection 83 at the intermediate portions thereof. Since this pin and slot connection is approximately vertically in line with the tab 80 for lifting the recorder, the tab 82 for lifting the reproducer is raised with amplified movement relative to that of the recorder; however, the tab 82 has a lowermost position at a considerable distance below the pin 68 so that the recorder may be raised from the record without raising the reproducer. This raising of only the recorder is accomplished as the lift rod 70 is raised from its lowermost to an intermediate position. As the lift rod is raised further to its uppermost position the reproducer is raised also and with amplified movement to a height about equal to that of the recorder. Thus, both units are lowered onto and lifted from the record as the lift rod is moved between fully-raised and fully-lowered positions and only the recorder is lowered onto and lifted from the record as the lift rod is moved between intermediate and lowered positions. In view of the functioning of the lift rod 70 here explained, its uppermost, intermediate and lowermost positions are herein termed its neutral, reproducing, and recording positions respectively.

In the present machine the lift rod is in recording position to place both the recorder and reproducer in engagement with the record during normal recording operation, but the circuits are completed only as to the recorder as is hereinafter described. To reproduce, the lift rod is raised to its intermediate or reproduce position to lift the recorder from the record and to complete the circuits with respect to the reproducer. To put the machine in inoperative conditions, the lift rod is raised to neutral position to disengage both recorder and reproducer from the record.

Several different control means of the machine are utilized to control positioning of the lift rod in connection with the control of other components of the machine. Each of these control means has only a one-way coupling with the lift rod effective to raise or retain the rod in reproducing and neutral positions but ineffective to force lowering of the rod. Only when each of these control means is positioned to permit lowering of the lift rod will the latter move to lowered position and then it does so by its own weight and the downward biasing thereof from the recorder and reproducer transmitted through the lever mechanism 69. Firstly, the lift rod has a one-way coupling with the record-securing mechanism effective to raise the lift rod to neutral position as the record-securing mechanism is released and to permit, but not force, the lift rod to be lowered as the record-securing mechanism is actuated. This is accomplished through a side arm 84 on the inner portion of the record-securing lever 32, the end portion of which underlies the lift rod to raise the same as the record-securing mechanism is released. Secondly, upon release of the lift rod from neutral position by the record-securing mechanism, the lift rod can be shifted between record and reproduce positions by a record-reproduce control mechanism 86 operable by a control knob 87. Thirdly, a safety mechanism 88 is provided to withhold lowering of the lift row from a neutral position except when a record is mounted on the turntable.

The record-reproduce control mechanism 86 comprises means to cause the bail 111 to be rocked clockwise as the knob 87 is raised and vice versa, as shown in FIGURE 8, and as is described in the Dietz patent aforementioned. The bail is coupled to a front-to-back extending shaft 116 so as to cause the latter to be turned counterclockwise as the knob 87 is raised, and vice versa.

On the rearward portion of the shaft 116 there is secured a hub 119 to the opposite ends of which are staked respective lever arms 120 and 121. The arm 120 carries a cross pin 122 which underlies the lift rod 70. When the control knob 87 is in record position this pin 122 is in a lowered position permitting the lift rod to assume its record position, but as the knob 87 is raised to reproduce position the pin 122 is moved to its uppermost position shown in FIGURE 8, which is a position permitting lowering of the lift rod 70 only to reproduce position. As hereinafter described, this reproduce position of the lift rod is one withholding the recorder from the record but permitting the reproducer to engage the record.

The arm 121 is pivoted to a link 123 extending transversely of the machine, and coupled to suitable switches to condition the machine electrically for recording when the knob 87 is depressed into record position and for reproducing when the knob 87 is lifted into reproduce position again as is described in the aforementioned Dietz patent.

Pivoted at 136 to the portion of the lift rod 70 below the bridge 22, and at a point just rearward of the central opening of a mounted record, is a detent 137 in the form of a bail having a depending finger 138 biased by its weight into a vertical position shown in FIGURE 4. For releasably retaining the detent more definitely in vertical locking position it may be made of magnetic material and may abut against a permanent magnet 139 bracketed to the bridge 22. In this downward position of the detent the finger 138 extends into a circular groove 140 (FIGURE 4) in the turntable concentric with the axis thereof, and terminates just short of the bottom wall of this groove. If the lift rod is released from upward position while the detent is in this vertical position the latter will abut against the bottom wall of the groove to lock the lift rod against movement out of neutral position.

When a record disc is inserted through the guideway 36 onto the turntable the same abuts against the detent 137 and cams it clockwise into an oblique position with respect to the record (FIGURE 5). This oblique position is beyond the critical angle for locking the lift rod and permits the lift rod to be lowered when the same is next released from neutral position, the detent sliding readily on the record and being cammed further clockwise as the lift rod is so lowered. As the detent 137 is lowered with the lowering of the lift rod and cammed clockwise by the record a lug 141 thereof moves into proximity with the magnet 139 to cause the detent to be attracted thereby in a further clockwise direction wherefore to disengage the finger 138 from the record. As either an additive or alternative means for so disengaging the finger 138 from the record, a lever 142 is pivoted at 143 also to the lift rod 70 and is biased counterclockwise (FIGURES 4 to 7) by a torsion spring 144. This lever has an arm 142a for striking against the lug 141 under pressure of the torsion spring to effect disengagement of the detent from the record. When the lift rod 70 is in neutral position shown in FIGURE 4, the lever arm 142a is in a raised ineffective position by reason of an arm 142b of the lever being then in abutment with the underside of the bridge 22. As the lift rod 70 is lowered—which is permissible only when a record is on the turntable to place the detent 137 in its oblique ineffective position—the lever 142 will be lowered and swung counterclockwise to cause the arm 142a to strike the lug 141 and swing the detent further clockwise wherefore to disengage it from the record. The actuated position of the lever 142 is defined by abutment of a stop lug 142c against the underside of the lift rod 70 as shown in FIGURE 6. When the lift rod is in its lowermost or record position, the relative positioning of the detent 137 and striking lever 142 may be approximate as shown in FIGURE 6. With the magnet 139 present the lug 141 may be in engagement therewith to hold the detent in a further actuated position. As the lift rod is raised from record position to reproduce position, the finger 138 of the detent comes into abutment with a stop lug 145 secured at 146 to the bridge 22 as shown in FIGURE 7. As the lift rod is raised from reproducing to neutral position the stop lug forces breaking of contact of the lug 141 of the detent from the permanent magnet 139, wherefore the detent will return counterclockwise to its oblique position to the record shown in FIGURE 5. As the detent is so returned with the lifting of the rod 70 to neutral position, the striking lever 142 is raised ahead of the lug 141 of the detent. In the sense that different portions of the detent 137 are moved into proximity with the magnet 139 to attract and releasably hold the detent in its effective and ineffective positions as the lift rod is raised and lowered, the magnet and the stated portions of the detent may be termed an over-center biasing means.

Since the safeguarding function of the detent 137 is to prevent lowering of the translating devices except when a record is on the turntable, the styli of these devices are safeguarded against being chipped and broken by being inadvertently impinged against and slid across the turntable. Also, since the translating devices are raised by release of the record-securing mechanism, the user is prevented from damaging the styli and possibly scratching the record by inadvertent attempts to mount and remove a record on and from the turntable while the translating devices are in a lowered record-engageable position.

Mounted on the lower side of the carriage plate 55 is a reverse drive motor RM for the carriage 49, which is coupled through beveled gearing 147 to the feed nut 59. When this motor is activated it overpowers the friction coupling 60 on the feed nut to turn the feed nut and drive the carriage in reverse direction back to its home or start position.

With reference next to the circuit diagram of FIGURE 9, there is a dictator's station 148 diagrammatically indicated and shown only as including an on-off station switch 149 by which a user will seize or place into use a dictating machine as this switch is shifted to on position. The switch has a hook extension 150 on its pole member which serves as a support for a handset 151. When the handset is placed on this hook the weight of the handset holds the switch in open position. The station switch is connected by leads 152 through a motor relay 153 to a line connector plug 154 adapted to be connected to a socket not shown of a 110 volt power line. When the user lifts the handset 151 from its support the switch is shifted closed to on position to activate the motor relay 153. Activation of the motor relay closes a switch 153a to connect a drive motor DM of the machine also to the power line via the plug 154. The drive motor has a drive coupling diagrammatically shown through a start-stop clutch 155 to the turntable 17. The turntable is in turn coupled through the worm gear 16a–18 and feed screw 19 to the carriage as before described. The start-stop clutch 155 is controlled also from the dictator's station by means not herein necessary to describe since such start-stop control by the user is well known as shown for example by the aforementioned Kobler patent.

When the user records to the end of the record an arm 49a of the carriage 49 moves against an end switch 156 to close an alarm circuit 157 running from the power plug 154 through an alarm device, for example an electric bell 158, and the end switch 156. This operation of the bell 158 signals the attendant to change the record.

When the attendant lifts the lid 38 it raises the lift rod 70 to disengage the styli from the record as before described. As the lift rod is so raised to a neutral position it moves against the pole member of a switch 159 mounted on the side of the bridge 22 (FIGURES 1 and 4) to close this switch. This raising of the lift rod to neutral position places the detent 137 in the oblique position shown in FIGURE 5. When the record disc is next withdrawn from the machine the detent 137 is propelled into an upright position by the magnet 139 as shown in FIGURE 4. In so turning to an upright position the lug 141 of the detent member moves against the pole member of a switch 160 mounted on the top of the bridge 22 to close this switch. The switches 159 and 160 are connected serially in the circuit of the reverse drive motor RM running from the plug 154 via the motor RM, a normally closed carriage start switch 161, and the switches 160 and 159 back to the plug. Thus, when the attendant opens the lid 38 and removes the record disc from the turntable the reverse drive motor RM is activated to start returning the carriage to home position. When the carriage reaches home the start switch 161 is opened to stop the motor. When the attendant replaces the record on the turntable and closes the lid 38, both of the switches 159 and 160 are opened so that the reverse drive motor RM is not restarted until the record is again changed.

If the attendant should accidentally lift the lid 38 while the machine is in use the alarm 158 is activated immediately from the plug 154 via a switch 153b, left contact, of the motor relay 153, and the switch 159 controlled by the lid. Such alarm given to the attendant while the machine is in use, which use may be indicated by a neon lamp 162 connected across the drive motor DM, apprises the attendant that an error was made so that she may immediately reclose the lid 38 without disrupting the progressive advance of the carriage.

The attendant may also be signalled whenever the user terminates his use of the machine by hanging up the handset onto the hook switch after the carriage has passed an intermediate end point in its forward travel. Such signalling—which is described in the aforementioned Kobler patent—comprises an intermediate end switch 163 which stands until the carriage reaches the prescribed intermediate end point and which is held closed during all advance of the carriage beyond this point. This intermediate end switch is connected in the alarm circuit via the switch 153b right contact. Upon the user terminating his use of the machine by shifting his station switch to off position the motor relay drops out to complete the alarm circuit from the plug 154 via the electric bell 158, switch 153b right contact, and intermediate end switch 163. The lifting of the lid 38 and removal of the record starts the return of the carriage to home position as before described. The instant the carriage has been returned past the intermediate end point just noted the intermediate end switch 163 is opened to stop the alarm.

Typically, about fifteen seconds time is required for the motor RM to drive the carriage through its full length of travel back to home position. The attendant may change the record disc in less than this time and, if so, may reclose the lid 38 to open the switch 159 and stop the reverse drive of the motor before the carriage reaches home position. In order to prevent this condition from normally happening, the attendant is advised not to close the lid 38 until the record is replaced and the alarm comes back on. Her lowering of the lid 38 will then stop the alarm. In order to obtain this operation a second switch 164 is provided under control of the lid by connecting the same to the aforedescribed lid control switch 159 through a tie line 165, and a second carriage start switch 166 is provided by connecting the same through a tie line 167 to the aforementioned carriage start switch 161. Thus, when the carriage reaches home position while the lid 38 is still open the alarm is reactivated via the switch 164 and the switch 166. Once the alarm is so reactivated the attendant closes the lid 38 to open the switch 164 and to cut off the alarm. As soon as a user seizes the machine and begins recording dictation the advance of the carriage reopens the switch 166 to remove the alarm control circuit just described.

The embodiment of my invention herein particularly described is a preferred embodiment illustrating an improved control and alarm system for remotely controlled dictating machines but is subject to changes and modifications without departure from the scope of my invention, which I endeavor to express according to the following claims.

I claim:

1. In a dictating machine: the combination of a record support, a carriage mounted for traveling movement in forward and reverse directions relative to said support, a movable translating device on said carriage urged towards said support, means including a lift member effective when in a raised position to withhold said translating device from said support, means defining a pathway for movement of a record onto and from said support, a detent means for latching said lift member in a raised position including a movable control member extending into said pathway for rendering the detent means effective when the support is free of a mounted record, and a reverse drive means controlled by said control member for returning said carriage to home position responsive to removing a record from said support.

2. In a dictating machine: the combination of a record support, a carriage mounted for traveling movement in forward and reverse directions relative to said support, a movable translating device on said carriage urged towards said support, means including a lift member effective when in a raised position to withhold said translating device from said support, means defining a pathway for movement of a record onto and from said support, a closure member for said pathway movable into open and closed positions, means responsive to opening said closure member for raising said lift member, detent means for said lift member controlled according to whether or not said support is free of a mounted record for allowing said lift member to be lowered responsive to moving said closure member to closed position while a record is mounted on said support, said detent means including a movable control member shifted into said pathway by opening said closure member to cause the control member to be moved in one direction by a record as the same is mounted on said support and in the other direction as a record is removed from said support, reverse drive means for returning said carriage to home position, and means controlled by said control member responsive to opening said closure member and thereupon removing a record from said support for starting said reverse drive means to return said carriage to home position.

3. The combination set forth in claim 2 including an alarm for signalling an operator to change the record on said support, and means for activating said alarm respectively when (1) said carriage reaches an end zone of its forward advance and (2) the operator opens said closure member while the machine is in use.

4. In a dictating machine: the combination of a record support, a carriage mounted for traveling movement in forward and reverse directions relative to said support, a movable translating device on said carriage urged towards said support, a lift member effective when in raised position for withholding said translating device from a record on said support, manually operable means for lifting said lift member into raised position, a detent member pivoted to said lift member and urged into a normal position relative to said support to retain the lift member in a raised position while the support is free of a mounted record, said detent member extending into the path of movement of a record onto said support and being cammed by a record into an oblique relationship to said support as the record is moved via said path onto said support, said detent member being rendered inoperative to retain said lift member in raised position when the detent member is shifted into said oblique position, reverse drive means for said carriage, and means operated by movement of said detent member as the member is moved from said oblique position into said normal position to start said reverse drive means.

5. In a dictating machine system including a dictator's station and a remote dictating machine including a rotatable record support, a translating head, a carriage, and a drive motor for advancing said carriage and simultaneously rotating said record support: the combination of an on-off station switch operable to start said drive motor when the switch is shifted to "on" position, an openable lid on said machine for gaining access to a record on said support, a reverse drive motor for returning said carriage to home position, means responsive only when both said lid is opened and a record is removed from said support for activating said reverse drive motor, and signalling means at said machine including a signalling device responsive to opening said lid when said station switch is in "on" position.

6. The dictating machine set forth in claim 5 including a control switch operated by movement of said carriage into home position, and means responsive to said carriage reaching home position while said lid is open for activating said signalling device.

7. In a dictating machine system including a dictator's station and a remote dictating machine including a rotatable record support, a translating head, a carriage, and a drive motor for advancing said carriage and simultaneously rotating said record support: the combination of an on-off station switch operable to start said drive motor when the switch is shifted to "on" position, an openable lid on said machine for gaining access to a record on said support, a reverse drive motor for returning said carriage to home position, means responsive only when both said lid is opened and a record is removed from said support for activating said reverse drive motor, a signalling device at said machine, means responsive to opening said lid while said station switch is "on" for activating said signalling device, means responsive to said carriage reaching the end of its forward travel for activating said signalling device, and means responsive to said carriage having been advanced past a predetermined intermediate end point in its forward travel and said on-off switch being returned to "off" position for activating said signalling device.

References Cited by the Examiner
UNITED STATES PATENTS 2,793,864  5/1957  Dietz _____ 274—13
2,994,746  8/1961  Collier et al. _____ 179—100.2

NORTON ANSHER, *Primary Examiner.*

J. F. PETERS, *Assistant Examiner.*